United States Patent [19]

Wranå

[11] Patent Number: 4,679,483

[45] Date of Patent: Jul. 14, 1987

[54] DISPENSER AND DISPENSING CASSETTE

[75] Inventor: Josef B. V. Wranå, Spånga, Sweden

[73] Assignee: U.S. Philips Corporation, New York, N.Y.

[21] Appl. No.: 827,120

[22] Filed: Feb. 7, 1986

[51] Int. Cl.⁴ .......................... B64D 1/02; F41F 5/00; H01Q 17/00

[52] U.S. Cl. ..................................... 89/1.51; 89/1.59; 102/505; 244/137.4

[58] Field of Search ....................... 89/1.51, 1.52, 1.59; 102/505; 343/18 E; 244/136, 137 A

[56] References Cited

U.S. PATENT DOCUMENTS

| | | | |
|---|---|---|---|
| 2,258,281 | 10/1941 | Dunajeff | 102/393 X |
| 2,395,547 | 2/1946 | Hojnowski | 89/1.59 |
| 3,626,415 | 12/1971 | Montgomery | 89/1.51 X |
| 3,808,940 | 5/1974 | Schillreff et al. | 89/1.51 X |
| 3,808,941 | 5/1974 | Biggs | 89/1.51 |
| 4,063,485 | 12/1977 | Carter et al. | 89/1.51 X |
| 4,524,670 | 6/1985 | Billard et al. | 89/1.51 X |
| 4,601,445 | 7/1986 | Duelos et al. | 89/1.51 X |

Primary Examiner—David H. Brown
Attorney, Agent, or Firm—Thomas A. Briody; Jack Oisher; William J. Streeter

[57] ABSTRACT

A dispenser for launching radar deflecting elements from dispensing cassettes which are detachably supported in respective cells of the dispenser, each cassette supporting therein at least two cartridges containing the deflecting elements. Each cassette comprises guide means which cooperates with guide means in the cell in which it is inserted so as to correctly position the cassette therein, means cooperating with locking means in the cell to retain the cassette in such position, and means for electrically coupling firing pins of the cartridges to fire control means in the dispenser.

4 Claims, 12 Drawing Figures

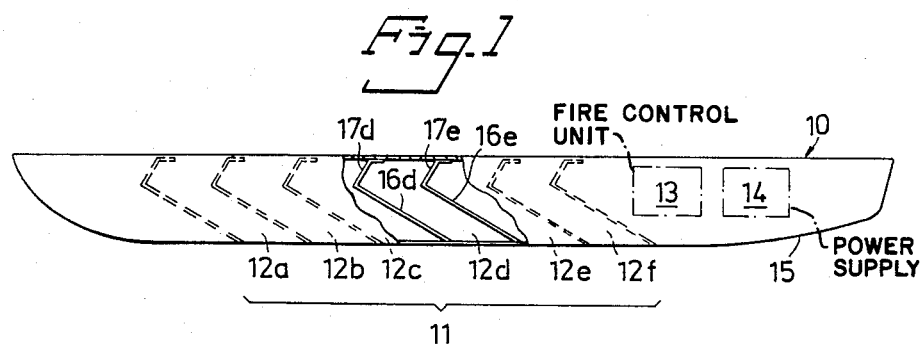
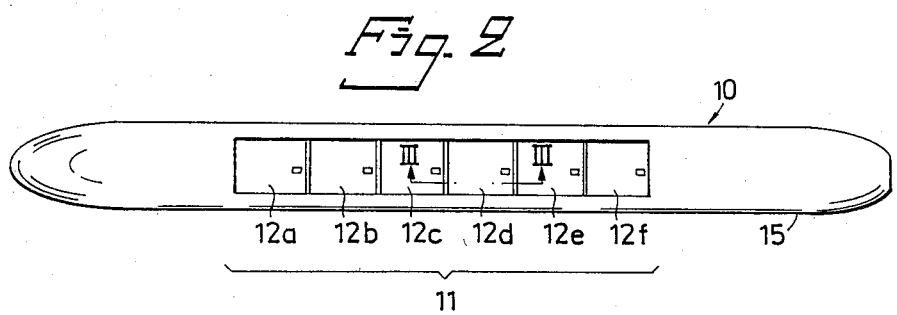
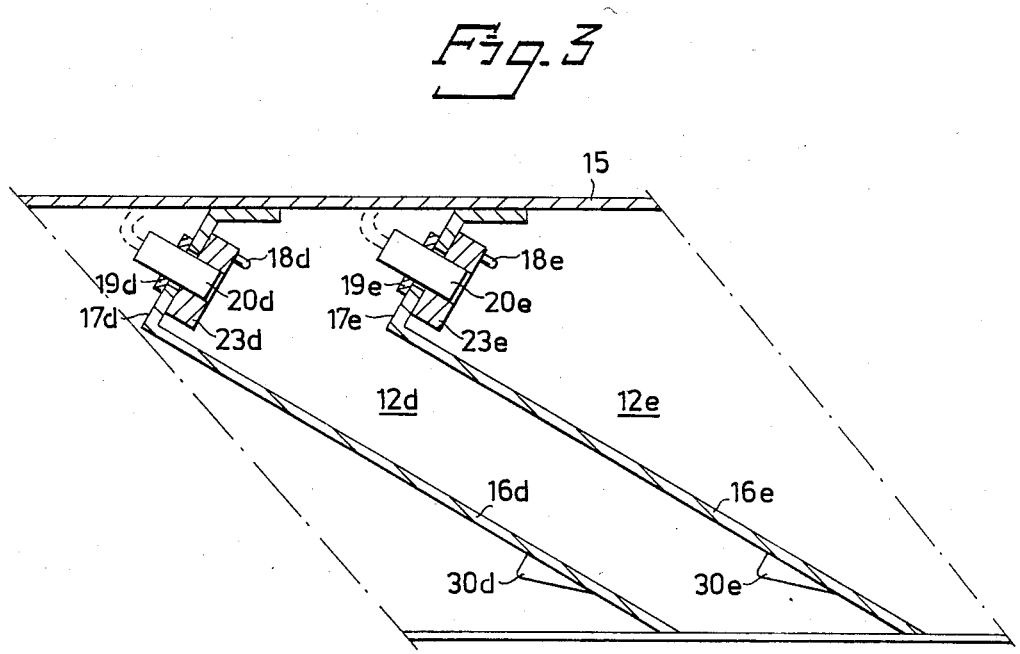

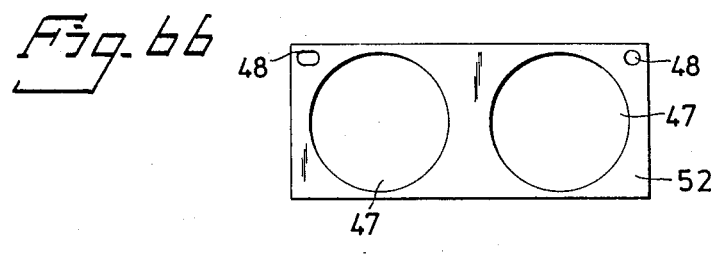
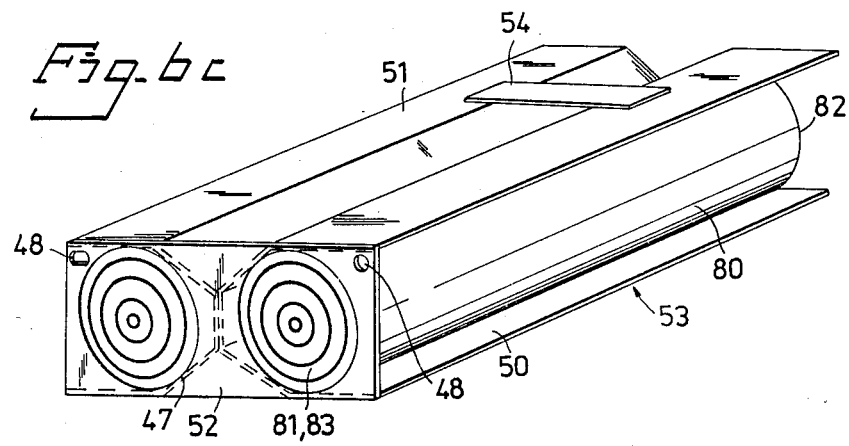
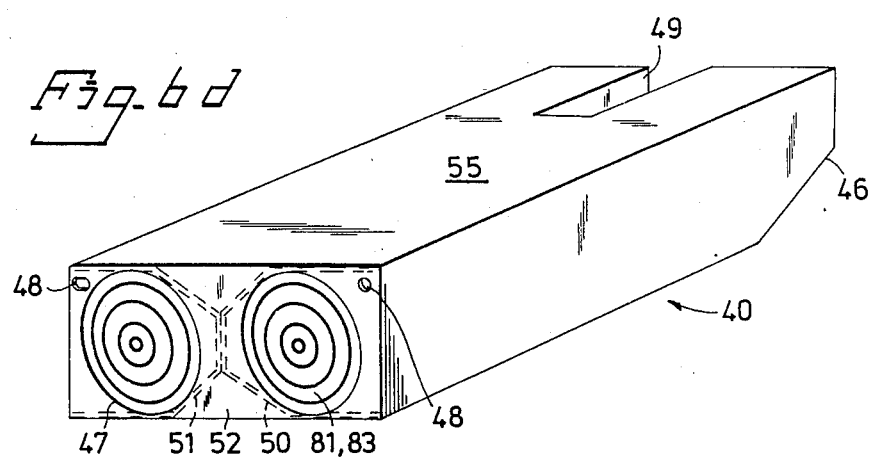

DISPENSER AND DISPENSING CASSETTE

BACKGROUND OF THE INVENTION

1. Field of the Invention

The present invention refers to a dispenser for launching of radar deflecting, preferably intended for arrangement on an airplane wing, comprising a fixedly mounted dispenser body having a magazine of cells filled with deflecting elements, each cell being electrically connected to an electronic firing control unit for supplying firing signals to cause dispensing of said deflecting elements. The invention also refers to a cassette adapted to be used together with the dispenser. The deflecting elements may be a radiation reflecting material, such as, for example, foil strips or metal coated fibres, but may also be flares or other active elements.

2. Description of the Related Art

Such a dispenser is disclosed in U.S. Pat. No. 3,430,533. The known dispenser is loaded by inserting a plurality of chaff packages (deflecting elements) into the open end of the cell. To separate the chaff packages from each other, spacer members are introduced between them. Finally the open end of the cell is closed by a retainer cap. The loading of the cells is rather time consuming and laborious. In the embodiment shown in FIG. 3, for example, four chaff package means, at least three spacer members and a retainer cap must be inserted to load the cell, i.e. at least eight insertion steps.

SUMMARY OF THE INVENTION

It is an object of the invention to provide a dispenser which is easy to load and has a short reload time.

Another object of the invention is to obtain a dispenser admitting the use of deflecting elements cassettes which are easily stored and transported.

According to the invention the dispenser is characterized in that said dispenser comprises in each of said cells, when prepared for dispensing, a detachable cassette, said cassette containing at least two cartridges holding said deflecting elements and being kept in position by the cassette, each cassette being provided with first means for cooperation with guide means of a respective cell for guiding a cassette, at least in the final stage of its insertion into the cell, and ensuring a correct dispensing position of the same and positioning relative to electrical coupling means connecting igniters of the cartridges with the electronic firing control unit, and being provided with second means for cooperation with a locking means for locking the dispensing cassette in said dispensing position.

The use of such a dispensing cassette only requires one insertion step when loading a cell. This may be compared with eight insertion steps necessary to load a cell of the prior art dispenser magazine described above. Each cartrige of a cassette may hold one separate set of counter means, but preferably contains several sets of counter means in correspondance with the cartridge known from European Pat. No. A 2 0 124 183 in applicant's name.

According to a preferred embodiment of the dispenser, the cells of the dispenser have a launching direction obliquely downwards and backwards relative to the flight direction of the airplane on which the dispenser is mounted. The inclined direction is advantageous when loading the dispenser. As soon as the cassette reaches the cell opening, the cassette does not need to be lifted in an upright direction under the influence of the gravity force, but may slide along the inner side of the cell in the inclined direction. This makes the insertion of the cassette less laborious. The stated launching direction furthermore contributes to a safe launching and a strong effect of the counter means.

The dispensing cassette according to the invention intended to be used together with the dispenser is characterized in that said cassette contains at least two cartridges holding deflecting elements kept in position by a cartridge retainer, first means for cooperation with guide means in the dispenser, second means for cooperation with dispenser locking means and third means for electrical connection of each cartridge in the cassette to the electrical coupling means of the dispenser. By means of the arrangement of cartridges holding counter means in a cassette, a dispenser cassette is obtained which is easy to handle and there is no need of storing boxes or the like when the cassette are stored or transported from the storing room to the airplane. While waiting for use the cassettes may be stored piled on each other in an appropriate storing room. When the cassettes are to be used they can be transported to the dispenser piled on each other. The cassette in combination with the cartridges also provides a good protection against mechanical damage of the counter means, which is of great importance for the dispenser operation. The cassette may, according to preferred embodiments, be provided with a porous filling material or a homogeneous plastic, providing shock absorption and fixing the cartridges to the retainer.

BRIEF DESCRIPTION OF THE DRAWINGS

The invention will be described in more detail below with reference to the accompanying drawings, in which FIG. 1 shows a side view of a dispenser according to the invention, FIG. 2 shows a bottom view of the dispenser according of the dispenser, FIG. 3 shows a section according to III—III in FIG. 2 of a part of the dispenser, FIGS. 6a, 6b, 6c and 6d show four stages of assembly of a dispensing cassette according to the first embodiment.

DESCRIPTION OF THE PREFERRED EMBODIMENTS

FIG. 1 shows the dispenser in a side view, the envelope being removed within an indicated area accommodating two cells for cassettes, the rest of the cells being indicated by means of dash-dotted lines.

Figure 4:
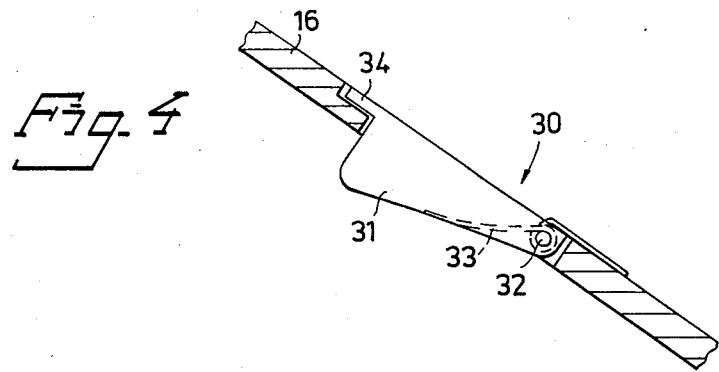
FIG. 4 shows locking means of the dispenser according to the invention.

The dispenser 10 shown in FIGS. 1-3 comprises a magazine 11 and a number of cells 12a-f, an electronic firing control unit 13, and a power supply unit 14, all comprising elements being accommodated in an envelope 15. In the following description the letter (a, b, c, d, e) in a reference number (for example 30d) means that the detail referred to relates to a specific cell, while the reference number without a letter (for example 30) means a reference to a detail in an arbitrary cell. The cells 12a-f of the magazine 11 are, as is most apparent from the FIG. 3, shaped by means of inclined plates 16a–f preferably of metal. Each of the plates 16 are provided with a transversely arranged plate 17 fastened at least at the upper part of the magazine and accordingly at the upper part of the envelope 15. The transversely arranged plate 17, which suitably is bent at the top, in the shown way is provided with guide means 18 for mechanical cooperation with a dispensing cassette and coupling means 20 for electrical coupling of cartridges contained in the cassette to the electronic unit. The guide means 18 are shown as guide pins projecting fron the transversely arranged plate and intended to cooperate wth recesses in an inserted cassette. Coupling means 20 are arranged for each cartridge 80 contained in a cassette and each coupling means 20 contain spring-loaded pins, not shown, which are arranged to be loaded against a contact plate 83 arranged in each cartridge bottom, see FIG. 6c. The contact plate 83 may, for example, consist of a number of concentric contact rings separated by insulating regions. Such a contact plate is shown in more detail and described in published Swedish Patent Specification No. 7414669, corresponding to U.S. Pat. No. 4,019,421, assigned to the present assignee. The coupling means 20 are fastened in the transversely arranged plate 17 by means of a holding ring 19 and on the cassette side surrounded by a shock absorbing spacer 23. In the open end of the cells 12a–f locking means 30a–f are arranged. The locking means 30 consist of, see FIG. 4, a tapering arm 30 rotatable around a shaft 32 located in the tapered end of the arm and spring loaded by means of a spring element 33 arranged around the shaft 32. In the wide end of the arm a stop element is arranged in the prolongation of the arm.

Figure 5:
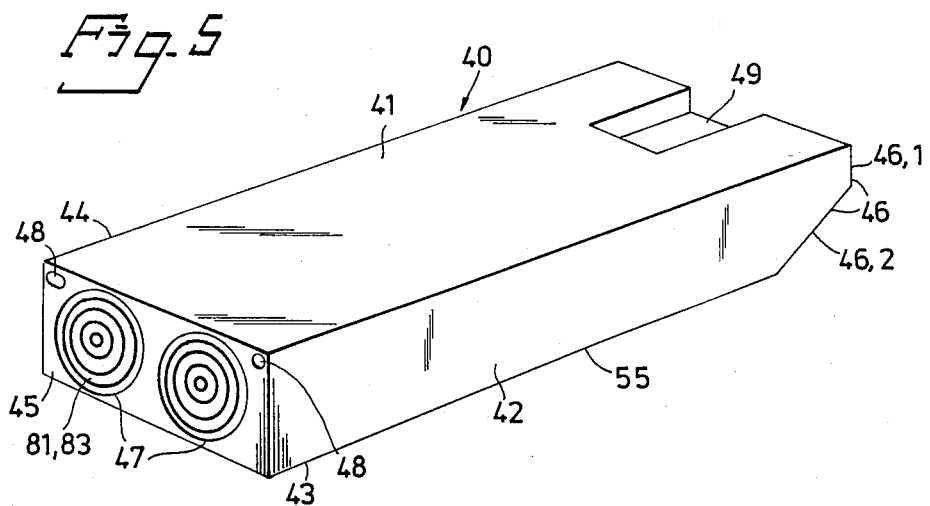
FIG. 5 shows a general embodiment of the dispensing cassette intended for the dispenser.

In FIG. 5 a general embodiment of a dispensing cassette 40 having two cartridges and intended to be used together with the dispenser as described above is shown. The cassette is defined by four rectangular side surfaces 41–44 and a first and a second end surface 45, 46. The fiest end surface 45 has a rectangular shape and substantially coincides with the bottoms 81 of the cartridges 80 located in the cassette 40. The second end surface 46 situated at the opening ends (82 in FIGS. 6c and 7b) of the cartridges 80 preferably consists of two relative to each other inclined rectangular shaped surfaces 46.1, 46.2. At the cartridge bottoms 81 end surface 45 is provided with openings 47 adapted to the cartridges 80 and the recesses 48 for cooperation with the guide pins 18 in the cell 82 of the dispenser magazine. A recess 49 is located in the greatest side surface 41 of the cassette adjacent to the second end surface 46 in order to cooperate with the locking means 30 described in connection with the dispenser.

The more detailed shaping of the cassette and its manufacturing will be described further on.

The dispenser 10 (FIGS. 1–3) is loaded by inserting dispensing cassettes 40 of the described kind into the dispenser magazine 11, a cassette 40 being arranged in each of the magazine cells 12a–f. When loading it is ensured that the end surface 45 faces the respective cell bottom surface and that the greatest side surface 41 is directed obliquely upwards. When the cassette is inserted, the locking means 30 are so affected of the cassette 40 that its rotatable arm 31 turns away. When the cassette 40 approaches the bottom of the cell 12, the guide pins 18 engage with the recesses 48 in the first end surface of the cassette 40 and guide the cassette 40 into a correct position. At the same time the spring-loaded coupling means 20 disposed in the bottom of the cell 12 engage with the respective contact plates 83 of the cartridges 80 of the cassette 40. When the cassette has reached its bottom position the locking means 30 locks the cassette 40 by swinging the spring-loaded arm 31 into the recess 49 on the greatest side surface 41 of the cassette.

When firing, the electronic firing control unit 13 of the dispenser is supplied control signals coming from outside. In response to the supplied control signals the electronic unit 13 distributes firing signals to igniters in the cartridges 80 in order to release a firing pin. The tapered section of the cassette 40, being tapered for aerodynamical reasons, splits at its second end surface 46 when the content of the cartridges is fired.

Empty cassettes 40 are removed from the magazine cell 12 by rotating the rotatable arm of the locking means 30 aside and the cassette 40 is pulled out and/or by means of its weight falls out of the cell. Thereafter it is possible to directly insert a new cassette 40 into the cell 12.

Figure 6A:
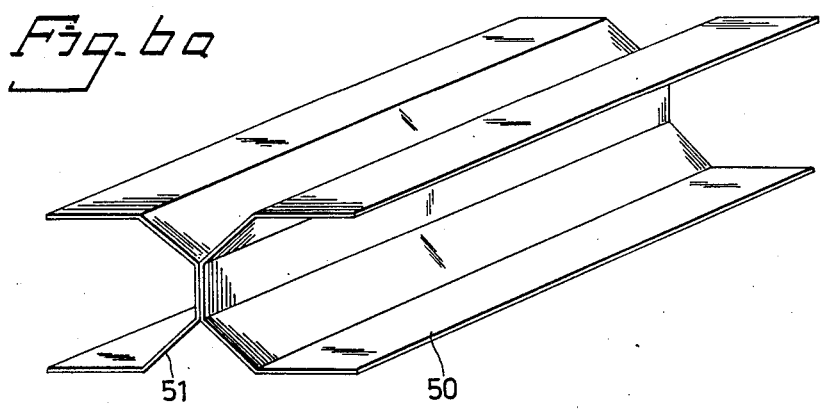

In the following description a first more detailed embodiment of the cassette 40 and its manufacture will be described with reference to FIGS. 6a–d. In FIG. 6a two metal elements 50, 51 are shown, the metal elements being shaped by means of punching from, for example, a metal plate followed by bending. In FIG. 6b a further metal element 52 shaped by means of punching is shown. The metal elements 50–52 are assembled by means of, for example, welding to frame 53 as apparent from FIG. 6c, which apart from the frame (retainer) shows two cartridges 80 disposed in the frame. Alternatively, the frame may be obtained by means of casting. As is apparent from FIGS. 6b–c, openings 48 for cooperation with guide pins and openings 47 for the cartridges 80 are provided in one end of the frame. Adjacent to the other end a metal plate 54 is fixed and adapted to cooperate with locking means 30 of the dispenser. FIG. 6c shows the cassette frame when loaded cartridges have been inserted into the frame. FIG. 6d shows the cassette when the frame has been provided with a cover 55 for fixing the cartridges to the frame (retainer). FIG. 6d discloses that the second end 46 of the frame 53 has been given a tapered shape, which is aerodynamically advantageous. The shape may be obtained by giving the metal elements 50, 51 a tapering shape at the second end 46 when they are punched. However, the tapering shape may be obtained entirely by means of the cover itself. Preferably the cover 55 consists of porous materials or homogeneous plastic films. Covers of this kind show high shock absorbing ability and are due to that fact particularly suitable.

Figure 7A:
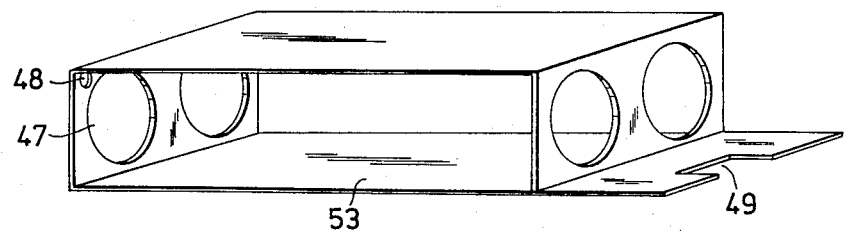
FIGS. 7a, 7b and 7c show three stages of assembly of a dispensing cassette according to a second embodiment.
Figure 7B:
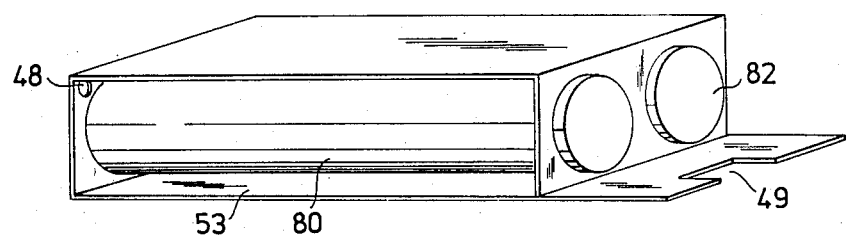
Figure 7C:
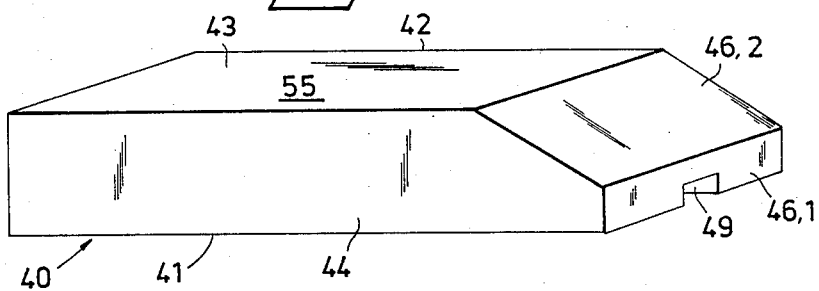

A second embodiment of a cassette and its manufacture will now be described with reference to FIGS. 7a–7c. FIG. 7a shows a cassette frame (retainer) 53 formed by means of punching and bending of a metal plate. Openings 47, 48 are punched for the cartridges 80 and the guide pins 18, respectively. Furthermore, a recess 49 for cooperation with the locking means 30 is punched adjacent to the second end surface. FIG. 7b shows the cassette frame after the insertion of cartridges. FIG. 7c shows the cassette 40 when the frame 53 having cartridges 80 has been provided with a cover 55 for fixing of the cartridges to the frame.

In the specification above one embodiment of the dispenser and two embodiments of the cassette have been disclosed. However, a lot of variants are comprised within the scope of the invention. For example, the locking means may be exchanged for other types and applied for engagement on another location of the cassette. Furthermore the guide pins and the recesses adapted thereto may be replaced with other types of guide means and means cooperating with the guide means.

What is claimed is:

1. An improved dispenser adapted for mounting on an airplane wing for launching radar deflecting elements, such dispenser comprising a plurality of cells containing such deflecting elements and an electronic fire control unit for supplying firing signals to such cells to cause such deflecting elements to be dispensed therefrom, such improvement being characterized in that each of said cells comprises:

a dispensing cassette detachably supported therein and containing at least two cartridges which respectively contain such deflecting elements, each cartridge having an electrical contact at one end thereof for receiving a firing signal for launching the deflecting elements therein;

electrical coupling means connected to said electronic fire control unit;

guide means in said cell adapted to engage corresponding guide means on said cassette when said cassette is substantially fully inserted into said cell, such cell guide means and cassette guide means cooperating to ensure that when inserted in said cell said cassette is positioned therein so that the electrical contacts of the cartridges in the cassette engage said electrical coupling means to receive said firing signals from said fire control unit; and locking means for detachably securing said cassette within said cell.

2. An improved dispenser as claimed in claim 1, further characterized in that said cells are supported in said dispenser in an inclined position such that when the dispenser is mounted on an airplane wing the deflecting elements in the cassettes therein will be launched in a direction obliquely downwards and backwards relative to such airplane wing.

3. A dispensing cassette for use in a dispenser as claimed in claim 1, comprising:

means for retaining therein at least two cartridges which contain said radar deflecting elements;

guide means adapted to engage corresponding guide means in said dispenser so as to correctly position said cassette therein when it is inserted in said dispenser;

electrical coupling means adapted to be connected to the electronic fire control unit of said dispenser and which engages electrical contacts at the ends of said cartridges when said cassette is correctly positioned in said dispenser; and means cooperating with locking means of said dispenser for detachably securing said cassette in said dispenser.

4. A dispensing cassette as claimed in claim 3, further characterized in that a section thereof is tapered so as to fit the contour of said dispenser when said cassette is correctly positioned therein.

* * * * *